United States Patent
Teranishi et al.

(10) Patent No.: US 8,516,441 B2
(45) Date of Patent: Aug. 20, 2013

(54) SOFTWARE OPTIMIZATION DEVICE AND SOFTWARE OPTIMIZATION METHOD

(75) Inventors: Masaomi Teranishi, Kawasaki (JP); Kenji Suzuki, Shinjuku (JP)

(73) Assignee: Fujitsu Semiconductor Limited, Yokohama (JP)

( * ) Notice: Subject to any disclaimer, the term of this patent is extended or adjusted under 35 U.S.C. 154(b) by 996 days.

(21) Appl. No.: 12/548,751

(22) Filed: Aug. 27, 2009

(65) Prior Publication Data

US 2009/0319988 A1    Dec. 24, 2009

Related U.S. Application Data

(63) Continuation of application No. PCT/JP2007/000183, filed on Mar. 8, 2007.

(51) Int. Cl.
    *G06F 9/44*    (2006.01)
(52) U.S. Cl.
    USPC .......................................... 717/110; 717/153
(58) Field of Classification Search
    None
    See application file for complete search history.

(56) References Cited

U.S. PATENT DOCUMENTS

| 6,718,543 | B2* | 4/2004 | Arai et al. ...................... 717/158 |
| 7,185,330 | B1* | 2/2007 | Khu .............................. 717/160 |
| 7,367,022 | B2* | 4/2008 | Lueh et al. ..................... 717/151 |
| 7,805,718 | B2* | 9/2010 | Baldischweiler et al. .... 717/159 |

FOREIGN PATENT DOCUMENTS

| JP | 2001-195279 A | 7/2001 |
| JP | 2005-063066 A | 3/2005 |
| JP | 2006-072991 A | 3/2006 |

OTHER PUBLICATIONS

"About buffer_overflow detection by stating analysis of C program," Goichi Nakamura et al., Mitsubishi Research Institute, IPSJ, Jul. 19, 2002, ISSN:0919-6072, Computer Security 18-18 (Jul. 18, 2002), pp. 117-124.

"OMPI: A Compile-time Optimizer for MPI Programs," Hirotaka Ogawa et al., IPSJ Journal, vol. 39, No. 6, Jun. 15, 1998, ISSN:0387-5806, pp. 1700-1708.

* cited by examiner

*Primary Examiner* — Elias Mamo
(74) *Attorney, Agent, or Firm* — Staas & Halsey LLP

(57) ABSTRACT

A software optimization device includes performance data storage unit to store data indicating performance of each system call, corresponding to a plurality of system calls, system call extraction unit to extract a system call described in a program source and similar-system-call detection unit to detect, from among the system calls the data indicating the performance of which is stored in the performance data storage unit, a system call having a function similar to that of the system call extracted by the system call extraction unit and having a performance better than that of the extracted system call.

6 Claims, 15 Drawing Sheets

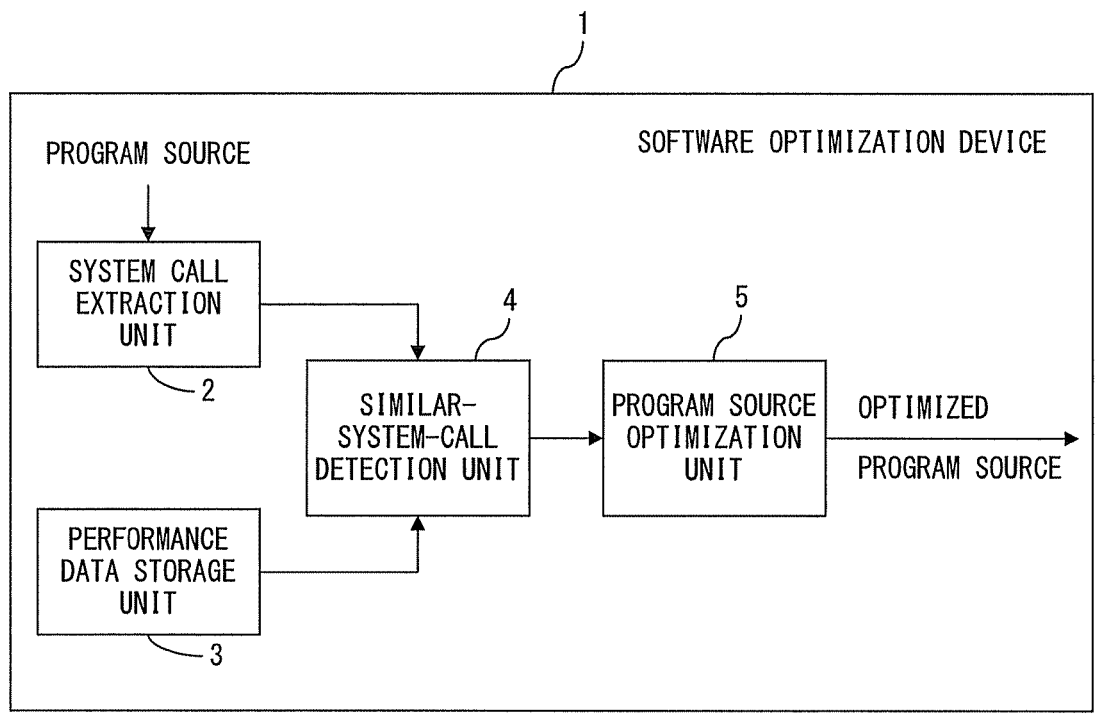
F I G. 1

| FUNCTION | NAME OF SYSTEM CALL | POWER CONSUMED |
|---|---|---|
| FUNCTION A | Systemcall_A1 | 100 |
| FUNCTION A | Systemcall_A2 | 50 |
| FUNCTION B | Systemcall_B | 20 |
| FUNCTION C | Systemcall_C1 | 10 |
| FUNCTION C | Systemcall_C2 | 10 |
| FUNCTION C | Systemcall_C3 | 20 |
| FUNCTION D | Systemcall_D1 | 10 |
| FUNCTION D | Systemcall_D2 | 10 |
| : | : | : |

F I G. 5

```
task1() {
  wai_flg(FLG1, 0x1, ..);
  ext_tsk();
}
task2() {
  set_flg(FLG1, 0x1);
  ext_tsk();
}
    :
```

FIG. 7

```
#define tslp_tsk(tmout)    slp_tsk()
#define wai_flg(flgid, waiptn, wfmode, p_flgptn)    slp_tsk()
              :
```

FIG. 9

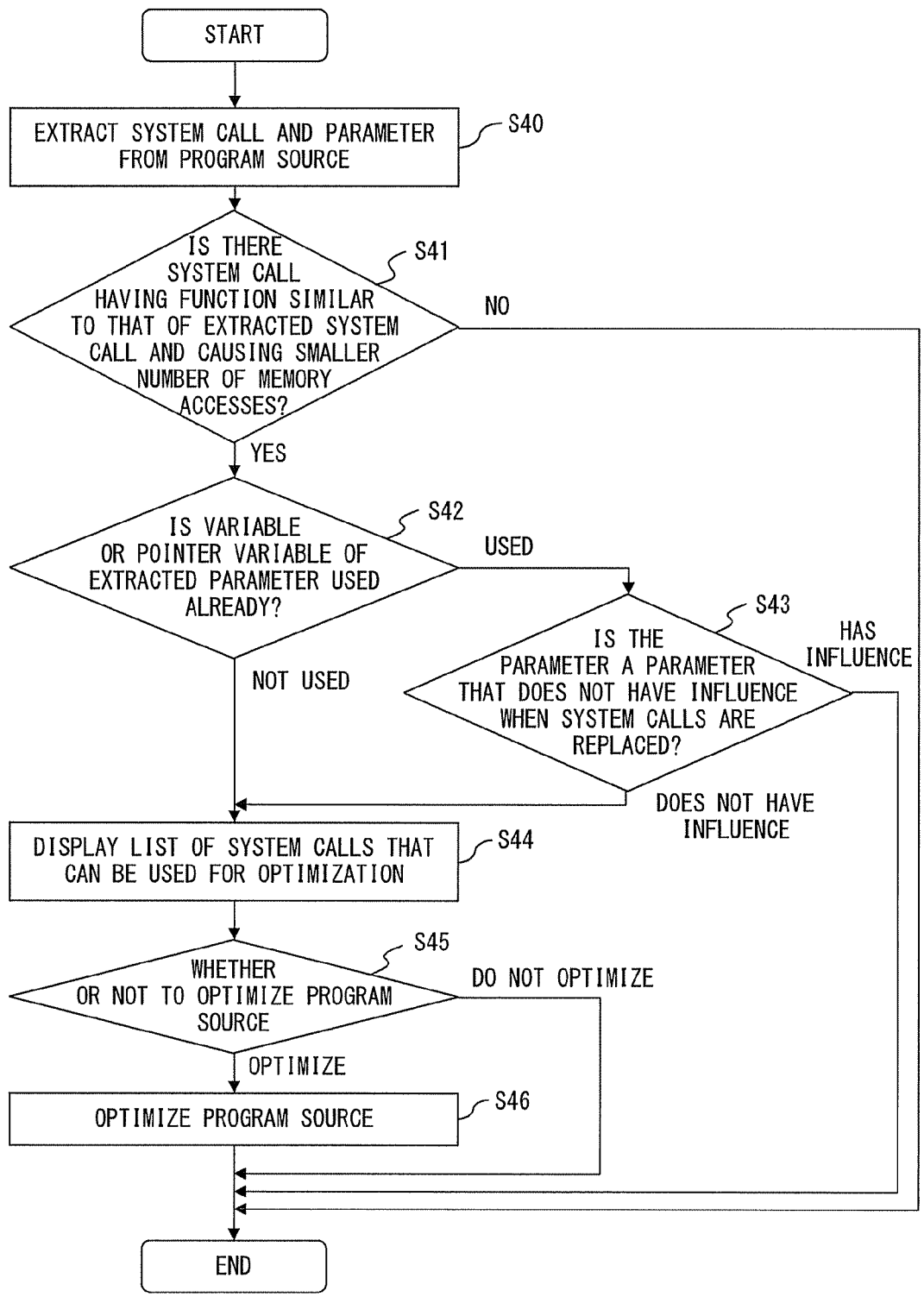
F I G. 1 1

| FUNCTION | NAME OF SYSTEM CALL | NUMBER OF MEMORY ACCESSES |
|---|---|---|
| FUNCTION A | Systemcall_A1 | 4 |
| FUNCTION A | Systemcall_A2 | 2 |
| FUNCTION B | Systemcall_B1 | 2 |
| FUNCTION C | Systemcall_C1 | 2 |
| FUNCTION C | Systemcall_C2 | 1 |
| FUNCTION C | Systemcall_C3 | 1 |
| FUNCTION D | Systemcall_D1 | 4 |
| FUNCTION D | Systemcall_D2 | 2 |
| : | : | : |

FIG. 12

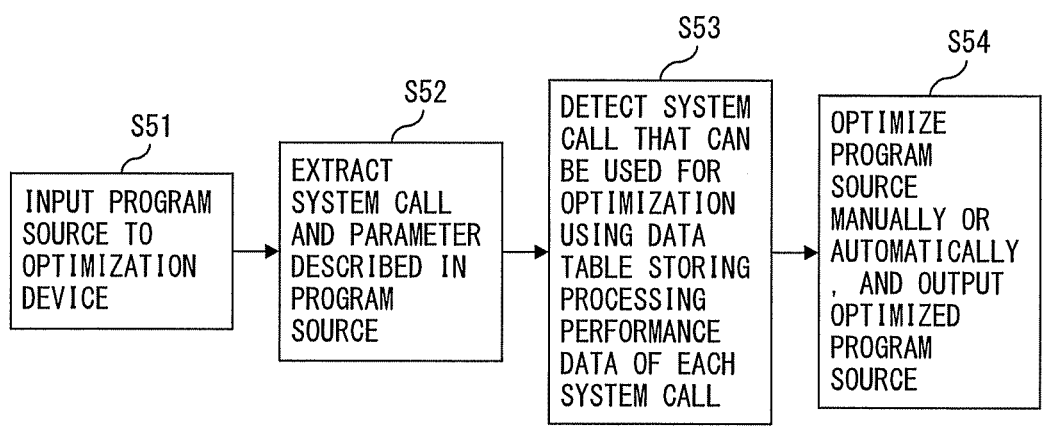
F I G. 1 3

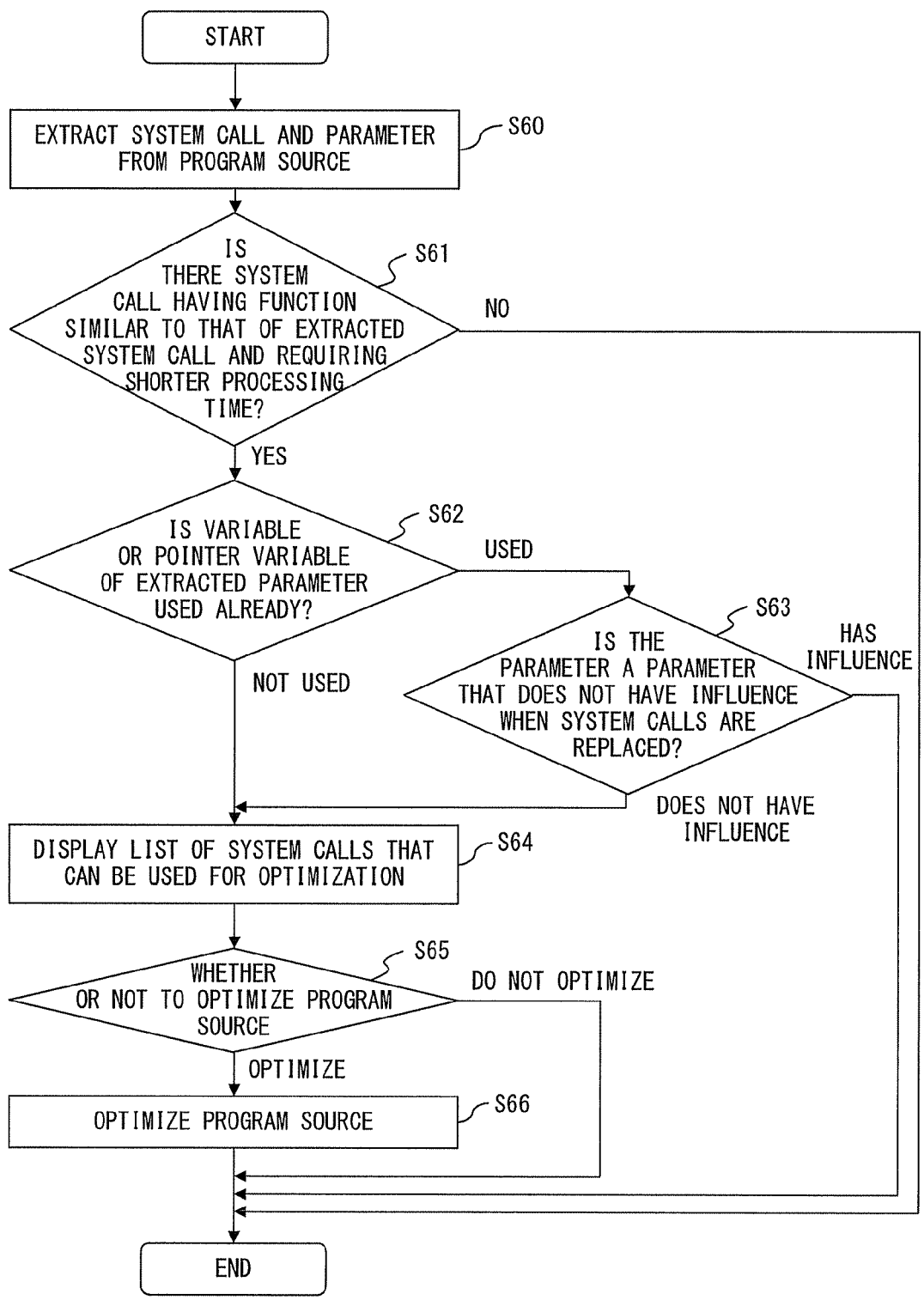
F I G. 1 4

| FUNCTION | NAME OF SYSTEM CALL | PROCESSING TIME |
|---|---|---|
| FUNCTION A | Systemcall_A1 | 4.0 |
| FUNCTION A | Systemcall_A2 | 2.1 |
| FUNCTION B | Systemcall_B1 | 1.5 |
| FUNCTION C | Systemcall_C1 | 2.2 |
| FUNCTION C | Systemcall_C2 | 1.4 |
| FUNCTION C | Systemcall_C3 | 1.6 |
| FUNCTION D | Systemcall_D1 | 2.8 |
| FUNCTION D | Systemcall_D2 | 2.0 |
| : | : | : |

F I G. 1 5

SOFTWARE OPTIMIZATION DEVICE AND SOFTWARE OPTIMIZATION METHOD

CROSS-REFERENCE TO RELATED APPLICATION

This application is a continuation of PCT application PCT/JP2007/000183, which was filed on Mar. 8, 2007.

FIELD

The embodiments discussed herein are related to a method of optimizing software, and more specifically to a software optimization device and a software optimization method for reducing the power consumption and improving the processing performance of software used in, for example, embedded systems utilizing multitasking operating systems.

BACKGROUND

In operations of the power saving optimization in application software running on multitasking operating systems (OS) or in software used in embedded systems utilizing multitasking operating systems, the steps of loading, onto target hardware, executable objects resulting from the compiling and linking of the program sources, making the software and hardware actually run, and reducing the measured power consumption are carried out. Similar steps are also carried out in operations of optimizing the processing performance of embedded systems. Consequently, in order to perform the optimization of software, operators or designers of embedded systems have needed to write the program, debug it, and load it onto the target so as to measure the power consumption and the processing performance, all of which required effort and time.

As a conventional technique of optimizing the power consumption of calculators or the like as described above, Japanese Laid-open Patent Publication No. 2005-63066 discloses a distributed computing system such as a grid computing system in which a computation processing unit is selected to perform partial computation on the basis of information on the power required for the partial computation, the importance of the partial computation, etc., in order to reduce the power consumption.

As another conventional technique related to the reduction in the power consumption of electric devices, Japanese Laid-open Patent Publication No. 2006-72991 discloses a technique of conducting appropriate mode switching taking into consideration of the power consumed by migration processing and return processing for switching between operation modes in order to solve the problem that when, for example, an electric device has to return immediately to the normal mode when the switching to the power-saving mode is being conducted, the time period in which the device operates in the power-saving mode is too short so that the switching to the power-saving mode actually increases the power consumption.

SUMMARY

According to an aspect of the embodiment, a software optimization device includes performance data storage device to store data indicating performance of each system call, corresponding to a plurality of system calls, system call extraction device to extract a system call described in a program source and similar-system-call detection device to detect, from among the system calls the data indicating the performance of which is stored in the performance data storage device, a system call having a function similar to that of the system call extracted by the system call extraction device and having a performance better than that of the extracted system call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating the principle of a software optimization device according to an embodiment of the present invention;

FIG. 5 illustrates an example of the data storage in the data table according to the first embodiment;

FIG. 7 illustrates an example of the influence of a parameter due to the replacement of system calls;

FIG. 9 illustrates a (second) processing method of optimizing a program source;

FIG. 11 is a detailed flowchart for a software optimization process according to the second embodiment;

FIG. 12 illustrates an example of the data storage in the data table according to the second embodiment;

FIG. 13 is a flowchart for a basic process of a software optimization method according to the third embodiment;

FIG. 14 is a detailed flowchart for a software optimization process according to the third embodiment; and FIG. 15 illustrates an example of the data storage in the data table according to the third embodiment.

DESCRIPTION OF EMBODIMENTS

Figure 2:
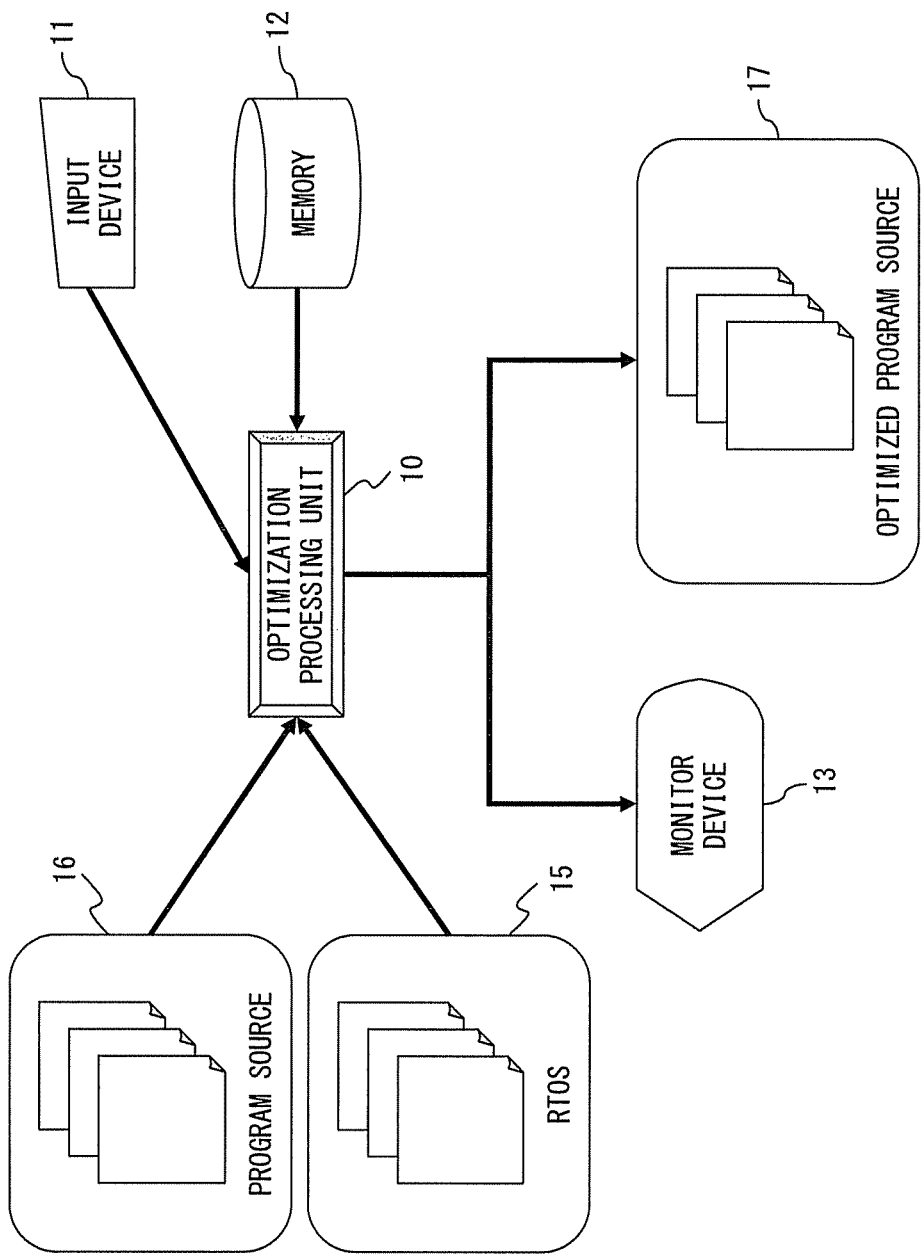
FIG. 2 is a configuration block diagram of a software optimization device according to the present embodiment.

FIG. 1 is a block diagram illustrating the principle of a software optimization device according to an embodiment of the present invention. In FIG. 1, a software optimization device 1 includes system call extraction unit 2, performance data storage unit 3, similar-system-call detection unit 4, and program source optimization unit 5.

The system call extraction unit 2 extracts system calls described in a program source as software to be optimized, and the performance data storage unit 3 stores data indicating the performance of each system call, corresponding to a plurality of system calls.

The similar-system-call detection unit 4 detects, from among the system calls the data indicating the performance of which is stored in the performance data storage unit 3, a system call that has a function similar to that of the system call extracted by the system call extraction unit 2 and that has a performance better than that of the extracted system call, and the program source optimization unit 5 replaces the system call extracted by the system call extraction unit 2 with the system call detected by the similar-system-call detection unit 4, and outputs the program source resulting from the replacement as an optimized program source.

In the present embodiment, the software optimization device 1 may further include replaceability determination unit that analyzes the use status of a parameter and a variable, and that determines whether or not the system call described in the program source can be replaced with the system call detected by the similar-system-call detection unit 4 when the system call extraction unit 2 extracts not only the system call described in the program source but also the parameter of the system call, and the variable corresponding to the extracted parameter is used in the system call detected by the similar-system-call detection unit 4 so that the program source optimization unit 5 performs the replacement of the system calls and outputs the optimized program source when the replacement is determined to be possible.

In the present embodiment, the performance of a system call may be the power consumed by the system call, the number of memory accesses caused by the system call, or the processing time required by the system call.

FIG. 2 is a configuration block diagram of a software optimization device according to the present embodiment. In FIG. 2, an optimization processing unit 10 performs the optimization of software according to the present embodiment, and may be considered to be, for example, one personal computer.

An input device 11, memory 12, and a monitor device 13 are connected to the optimization processing unit 10, and by using a real time operating system (RTOS) 15, the optimization processing unit 10 performs an optimization process on a program source 16 that has been input, and outputs the processed program source as an optimized program source 17. The operating system in, for example, an embedded system has to start operating when, for example, a certain button is pressed by a user, and the RTOS 15 is needed for this purpose.

Figure 3:
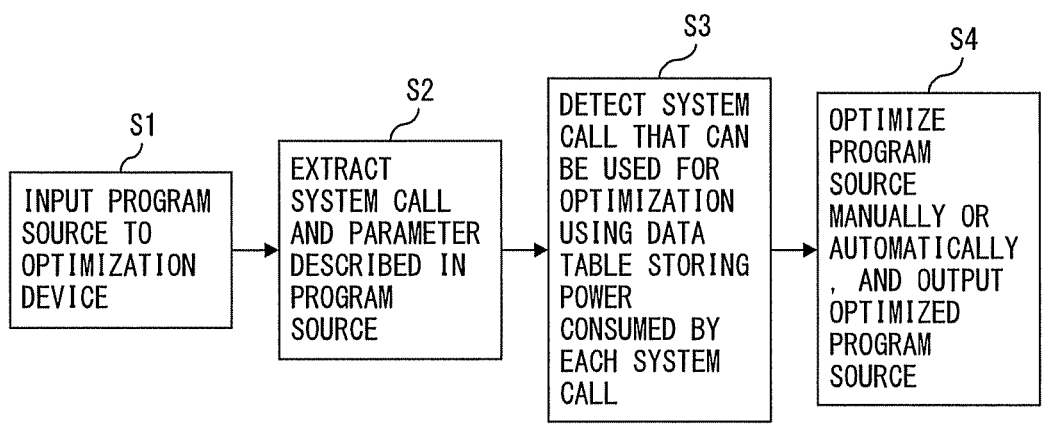
FIG. 3 is a flowchart for a basic process of a software optimization method according to the first embodiment.

FIG. 3 is a flowchart for a basic process of a software optimization method according to the first embodiment. In FIG. 3, a program source to be optimized is input into the optimization device in step S1; a system call and the parameter described in the program source are extracted in step S2; a system call that can be used for the optimization is detected using a data table storing the power consumed by each system call in step S3; the optimization operation is performed manually or automatically, and the optimized program source is output in step S4. In the actual optimization operation, the system call described in the program source is replaced with the system call detected in step S3 as a system call usable for the optimization, and the optimized program is output. In other words, in this first embodiment, the performance of a system call is represented by the data indicating the power consumed by the system call.

Figure 4:
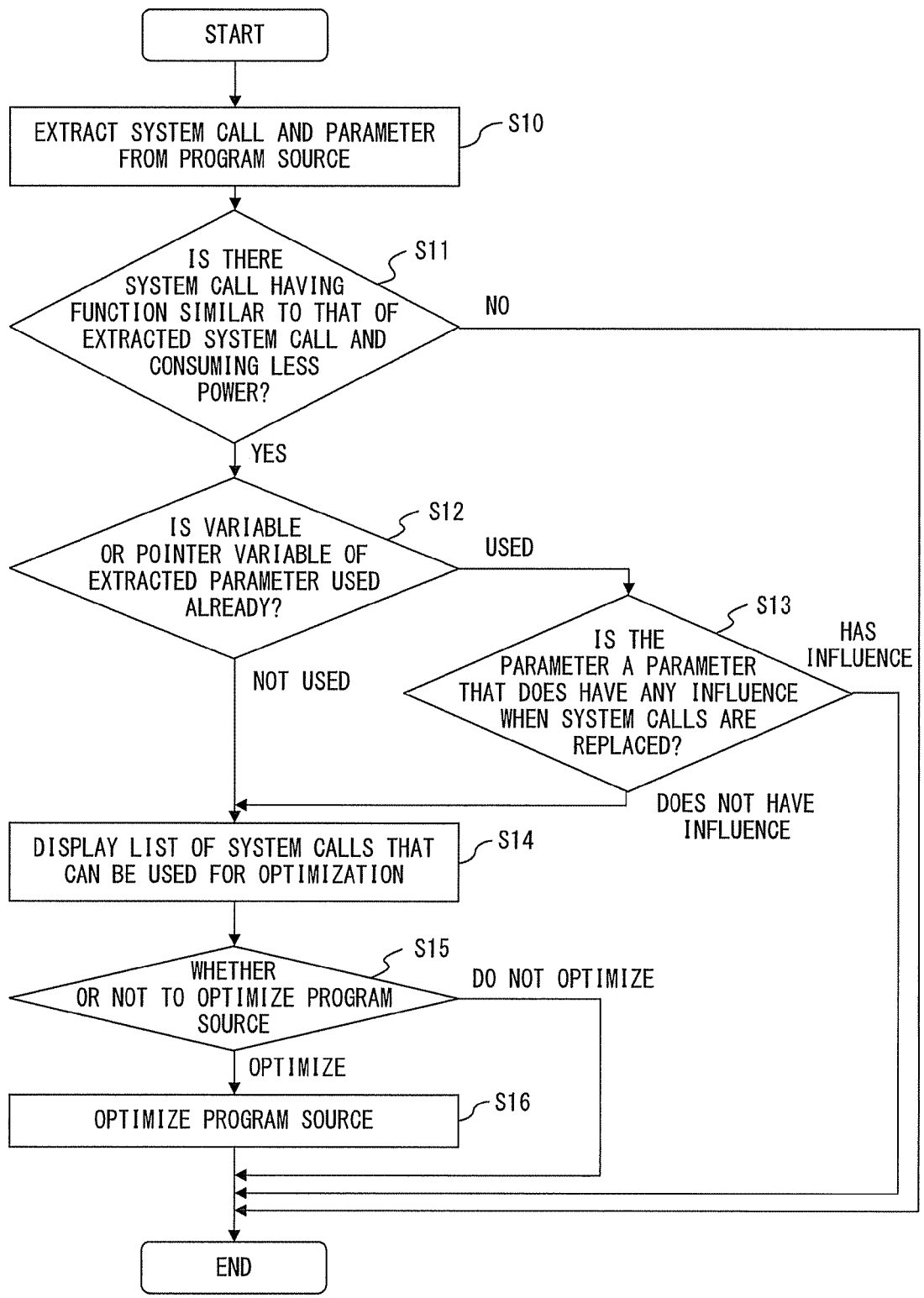
FIG. 4 is a detailed flowchart for a software optimization process according to the first embodiment.

FIG. 4 is a detailed flowchart for a software optimization process according to the first embodiment. In FIG. 4, when the process is started, a system call and the parameter are extracted from the program source first in step S10, and a data table stored in, for example, the memory 12 in FIG. 2, specifically the data table representing the power consumed by each system call, is used to determine whether or not there is a system call that has a function similar to that of the system call extracted from the program source and that consumes less power in step S11. When there is not such a system call, the process is terminated immediately.

FIG. 5 illustrates an example of the content stored in the data table in the first embodiment. In FIG. 5, performance data is stored which indicates that there are system calls A1 and A2 having substantially the same function, e.g., function A, and that the power consumed by system call A2 is 50 when the power consumed by system call A1 is regarded as 100.

When it is determined in step S11 in FIG. 4 that there is a system call that consumes less power, it is determined in step S12 whether or not the variable or pointer variable corresponding to the parameter extracted from the program source is used by the system call that consumes less power.

When such a variable is used, it is determined in step S13 whether or not the parameter is a parameter that does not influence the operation even when the system calls are replaced to optimize the program source, and if the parameter is to influence the operation, the replacement of the system calls is considered difficult and the process is terminated immediately.

Figure 6:
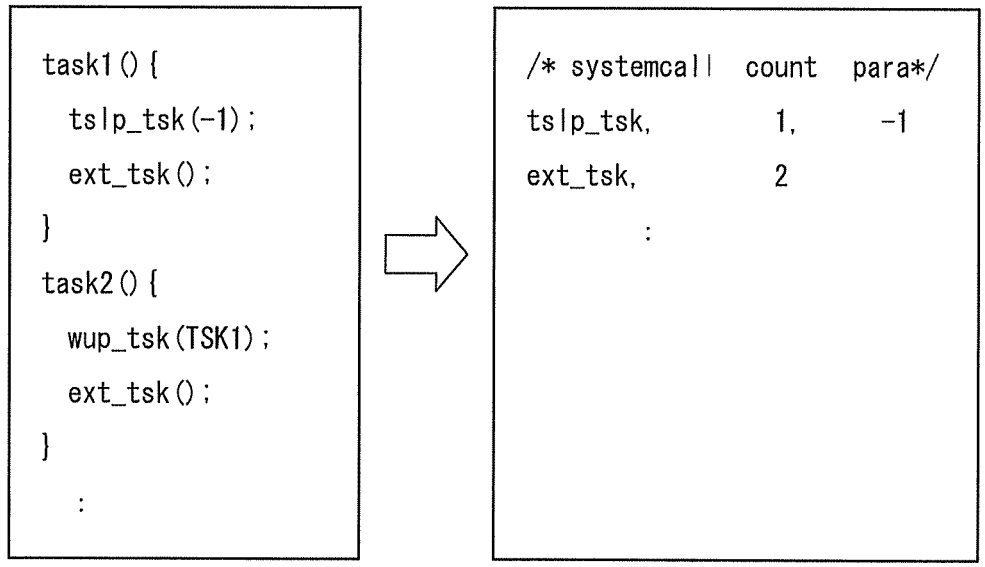
FIG. 6 illustrates an example of system calls extraction from a program source.

FIG. 6 illustrates a specific example of system calls and the parameters extracted from a program source. In FIG. 6, a program source is illustrated on the left, and the system calls and their parameters extracted from the program source are illustrated on the right. Specifically, it is illustrated that a sleep task with timeout (tslp_tsk) and an exit task (ext_tsk) instructing the termination of the task are extracted as the system calls, the numbers of times the extraction is carried out are 1 and 2 respectively, and the parameter of the system call tslp_tsk is "−1".

The argument "−1" in the system call tslp_tsk(−1) in the program source on the left of FIG. 5 is one of the parameters explained on the right of FIG. 5, and this parameter "−1" means endless sleep while the system call is sleep with timeout. If this argument is a value other than "−1", e.g., "10" or "100", then the sleeping operation times out when the time period corresponding to the value has elapsed. However, because this system call with this argument means endless sleep, it can be replaced with the system call slp_tsk( ), which has the same meaning. As the replacement with that system call eliminates the need for processes of monitoring the timeout operation, etc., speeding up, in other words the power consumption reduction, is realized.

When it is assumed on the data table in FIG. 5 that, for example, function A represents a sleep function, system-call_A1 represents the system call tslp_tsk( ), and system-call_A2 represents the system call slp_tsk( ), the replacement of the system calls can reduce the consumed power by half.

FIG. 7 illustrates the influence of a parameter that undergoes the determination in step S13. In FIG. 7, the system call wai_flg in task 1 is a system call waiting a set of flags, and the system call set_flg in task 2 is a system call for setting flags. It is illustrated that these two system calls are used only for the synchronization between the operations of tasks 1 and 2 and that the flag ID specifying the flag that is to be set is FLG1. The ID FLG1 is a variable corresponding to a parameter, and when this flag is also used for, for example, synchronization with the operation of another task, this flag cannot be omitted in the replacement of system calls. However, the flag is used only for the synchronization between tasks 1 and 2 in this example, and accordingly the operation of the program is not influenced even when the variable "FLG1" is omitted in the replacement of the system call wai_flg in task 1 with the system call slp_tsk( ) and the replacement of the system call set_flg in task 2 with a wake up task signifying waking up from a sleep state, specifically wup_tsk( ).

When a variable or a pointer variable corresponding to the parameter is not used in step S12 or when the parameter being used is determined to be a parameter that does not influence the operation of the program source even when the system calls are replaced in step S13, a list of the system calls that can be used for the optimization is displayed in step S14. This list of the system calls includes the system calls that can each replace the plurality of individual system calls extracted from the program source in step S10 and can be used for the optimization. Even when there are plural system calls that consume less power among the system calls having the same function for example, one of these system calls is determined in advance as a system call that can be used for the optimization, and the list including the system calls that can replace the extracted system calls in a form in which one system call is associated with one of the system calls extracted from the program is displayed.

Thereafter, it is determined in step S15 whether or not to automatically optimize the program source, and when the optimization is to be performed by, for example, the designer of the embedded system manually instead of automatically, the process as a process performed by the optimization processing unit is terminated. When the optimization is to be performed automatically, the optimization of the program source is performed automatically in step S16, and the process is terminated. When the optimization is performed manually by the designer, the list of the system calls displayed in step S14 may be used.

The performance data storage unit in claim 1 of the present invention corresponds to the memory 12 in FIG. 2, and the display unit in claim 4 corresponds to the monitor device 13. The system call extraction unit, the similar-system-call detection unit, the program source optimization unit, and the replaceability determination unit in claims 1 through 3 all correspond to the optimization processing unit 10 in FIG. 2; however, the system call extraction unit, the similar-system-call detection unit, the program source optimization unit, and the replaceability determination unit execute the processes of, for example, steps S10, S11, S16, and S13 in FIG. 4, respectively.

Figure 8:
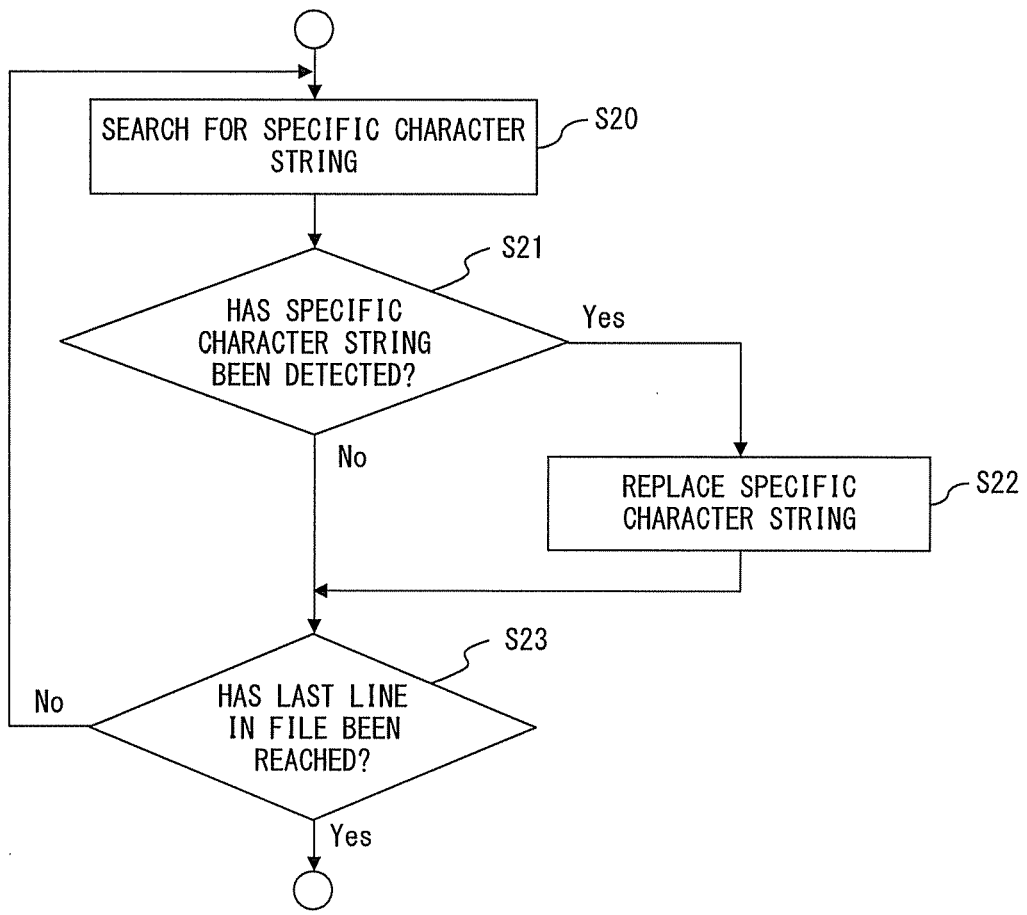
FIG. 8 illustrates a (first) processing method of optimizing a program source.

As a method of automatically optimizing a program source, there are, for example, a method using an editor and a method using a compiler. FIG. 8 is a detailed flowchart for a program source optimization process using an editor. When the process in FIG. 8 is started, a process of searching for a specific character string in the program source starts in step S20. In the above described example, the specific character string is tslp_tsk( ), and it is determined in step S21 whether or not the character string has been detected, followed by step S22 which is executed when the character string has been detected and in which the specific character string is replaced with, for example, slp_tsk( ). After step S22 or when the character string has not been detected, it is determined in step S23 whether or not the last line in the file of the program source has been reached. When the last line has not been reached, the processes in and after step S20 are repeated, and when the last line is determined to have been reached, the process is terminated.

FIG. 9 illustrates an example of a file generated using a compiler. In FIG. 9, it is illustrated that the system call tslp_tsk (tmout) is defined as the system call slp_tsk( ), meaning that tslp_tsk (tmout) is to be replaced with slp_tsk( ). It is also illustrated that the system call wai_flg is defined as the system call slp_tsk( ).

Figure 10:
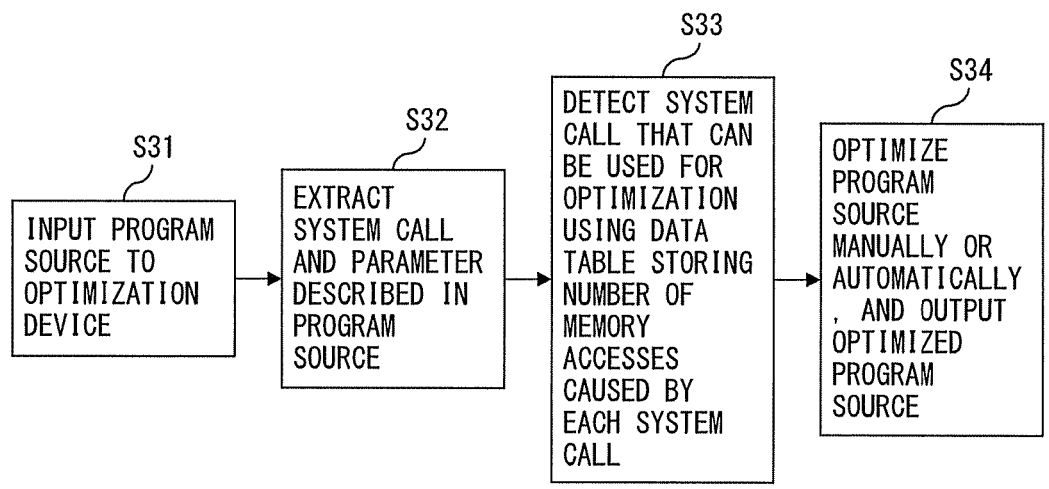
FIG. 10 is a flowchart for a basic process of a software optimization method according to the second embodiment.

FIG. 10 is a flowchart for a basic process of a software optimization method according to the second embodiment. In comparison with FIG. 3 of the first embodiment, the processes in steps S31, S32, and S34 in FIG. 10 are the same as those in steps S1, S2, and S4 in FIG. 3. However, the second embodiment is different in that the system calls that can be used for the optimization are detected in step S33 using a data table storing the number of memory accesses for each system call. In other words, in this second embodiment, the optimization of program sources is performed by reducing the number of memory accesses, and because the number of accesses to built-in memory is also an important indicator of the power consumption of an embedded system, the power consumption can be reduced by reducing the number of memory accesses.

FIG. 11 is a detailed flowchart for a software optimization process according to the second embodiment. This flowchart has some basic differences from FIG. 4 of the first embodiment, in that it is determined in step S41 corresponding to S11 in FIG. 4 whether or not there is a system call that has a function similar to that of the system call extracted from the program source and that causes a smaller number of memory accesses.

FIG. 12 illustrates an example of the content stored in the data table used for the determination in step S41 in the process flowchart in FIG. 11. The number of memory accesses for each of the system calls, which usually exist in plural, having respective functions is stored on the data table.

FIG. 13 is a flowchart for a basic process of a software optimization method according to the third embodiment. FIG. 13 has some basic differences from FIG. 3 of the first embodiment, in that a system call that can be used for the optimization is detected using a data table storing data on processing performance, such as data indicating a processing time, for each system call in step S53 corresponding to step S3 in FIG. 3.

FIG. 14 is a detailed flowchart for a software optimization process according to the third embodiment. FIG. 14 has some basic differences from FIG. 4 of the first embodiment only in that it is determined whether or not there is a system call that has a function similar to that of the system call extracted from the program source and that requires a shorter processing time in step S61 corresponding to step S11 in FIG. 4.

FIG. 15 illustrates an example of the content stored in the data table used for the determination in step S61 in FIG. 14. A processing time required for processing of the system call is stored for each of the system calls having the same function, which usually exist in plural.

Embodiments of the present invention have been explained in detail, and embodiments of the present invention realizes software optimization for power saving and improvement in the processing performance of a system without depending upon, for example, the technical expertise levels of the system designers. Also, because system calls that can be used for the optimization are displayed, the operating efficiency in the optimization can be improved considerably.

All examples and conditional language recited herein are intended for pedagogical purposes to aid the reader in understanding embodiments of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions have been described in detail, it should be understood that the various changes, substitutions, and alterations could be made hereto without departing from the spirit and scope of the invention.

What is claimed is:

1. A software optimization device, comprising a computer which includes a memory, the computer being configured to perform a process including:

storing performance data indicating performance of each system call in the memory, corresponding to a plurality of system calls;

extracting a system call described in a program source; and detecting, from among the system calls for which the performance data is stored in the memory a system call having a function similar to that of the system call extracted by the extracting and having a performance better than that of the extracted system call;

wherein the performance data of the system call stored in the memory is an amount of power consumed by the system call; and the detecting detects a system call consuming less power than the system call extracted by the extracting; and wherein the performance data of the system call stored in the memory is a number of memory accesses caused by the system call; and the detecting detects a system call causing a smaller number of memory accesses than that caused by the system call extracted by the extracting.

2. The software optimization device according to claim 1, the process further including:

replacing the system call described in the program source with the system call detected by the detecting, and outputting, as an optimized program source, a program source obtained as a result of the replacing.

3. The software optimization device according to claim 2, wherein:

the extracting extracts not only the system call described in the program source but also a parameter of the system call;

the process further includes analyzing a use status of the parameter and a variable and determining whether or not the extracted system call can be replaced with the detected system call when the variable corresponding to the extracted parameter is used in the system call detected by the detecting; and the replacing replaces the system calls, and the outputting outputs the optimized program source when the replacement is determined to be possible in the determining.

4. The software optimization device according to claim 1, the process further including:

displaying a list of system calls on a display when the detecting detects a plurality of system calls.

5. The software optimization device according to claim 1, wherein:

the performance data of the system call stored in the memory is a processing time required by the system call; and the detecting detects a system call requiring a shorter processing time than that required by the system call extracted by the extracting.

6. A software optimization method, comprising:

extracting a system call described in a program source;

by using performance data, stored in a memory, indicating a performance of each system call corresponding to a plurality of system calls, detecting, from among system calls for which the performance data is stored in the memory, a system call having a function similar to that of the system call extracted by the extracting and causing a smaller number of memory accesses than that caused by the system call extracted by the extracting or consuming less power than the system call extracted by the extracting; and replacing the system call described in the program source with the detected system call, and outputting, as an optimized program source, a program source obtained as a result of the replacement.

\* \* \* \* \*